United States Patent [19]

Inoue et al.

[11] Patent Number: 5,350,833

[45] Date of Patent: Sep. 27, 1994

[54] PROCESS FOR PRODUCTION OF POLYARYLENE SULFIDES

[75] Inventors: Hiroshi Inoue; Toshikazu Kato, both of Mie, Japan

[73] Assignee: Tosoh Corporation, Yamaguchi, Japan

[21] Appl. No.: 82,519

[22] Filed: Jun. 25, 1993

Related U.S. Application Data

[63] Continuation of Ser. No. 773,000, Oct. 8, 1991, abandoned.

[30] Foreign Application Priority Data

Oct. 8, 1990 [JP] Japan ................................ 2-268314

[51] Int. Cl.$^5$ .............................................. C08G 75/14
[52] U.S. Cl. ...................................... 528/388; 525/537
[58] Field of Search ......................... 528/388; 525/537

[56] References Cited

U.S. PATENT DOCUMENTS

| | | | |
|---|---|---|---|
| 3,919,177 | 11/1975 | Campbell | 528/388 |
| 4,282,347 | 8/1981 | Tieszen et al. | 528/388 |
| 4,631,336 | 12/1986 | Idel et al. | 528/388 |
| 4,663,430 | 5/1987 | Ostlinning et al. | 528/388 |
| 5,008,368 | 4/1991 | Nesheiwat | 528/388 |

FOREIGN PATENT DOCUMENTS 3528978  2/1987  Fed. Rep. of Germany.

*Primary Examiner*—Melvyn I. Marquis
*Assistant Examiner*—H. Lee
*Attorney, Agent, or Firm*—Sughrue, Mion, Zinn, Macpeak & Seas

[57] ABSTRACT

In a process for preparing a polyarylene sulfide by reacting an alkali metal sulfide and at least one dihaloaromatic compound in an organic amide solvent at an elevated temperature: a highly pure anhydrous alkali metal sulfide reactant having a purity of at least 95% by weight and a content of alkali metal hydrosulfide impurity of not greater than 2% by weight is employed. The water is deliberately added in a proportion of 0.1 to 0.8 moles per each mole of the alkali metal sulfide used in the process. The alkali metal sulfide reactant is charged in a concentration of 2.5 to 5 moles per liter of the reaction mixture. The deliberate addition of water enables one to omit a dehydration stage which has been desirably or rather necessarily effected to obtain a satisfactory polymer product where a hydrous alkali metal sulfide reactant is employed. The improved process of the invention provides a highly pure polyarylene sulfide product having a relatively increased molecular weight and a decreased content of by-product oligomers.

13 Claims, No Drawings

PROCESS FOR PRODUCTION OF POLYARYLENE SULFIDES

This is a continuation of application No. 07/773,000 filed Oct. 8, 1991, now abandoned.

BACKGROUND OF THE INVENTION

1. Field of the Invention

This invention relates to an improved process for production of polyarylene sulfides and, in particular, to such a process which enables efficient production of a highly pure polyarylene sulfide having a decreased content of by-product oligomers and a relatively increased molecular weight.

Polyarylene sulfides including polyphenylene sulfide, abbreviated as PPS hereinafter, as a typical example have excellent heat and chemical resistance properties and, hence, have attracted a good deal of attention as materials useful for producing parts in electrical and electronic instruments, automotive parts and the like. The materials may be formed or molded, for example, by injection, extrusion or the like technique into various molded or shaped parts, films, sheets, fibers and the like. These molded or shaped products have been used in a wide range of applications where high heat and chemical resistance properties are required.

2. Prior Art

Various processes for production of the polymeric materials are known. A typical method is disclosed, for example, in Japanese Patent Publication (KOKOKU) No. 45-3368, which method comprises reacting a dihaloaromatic compound with a sulfur source, such as sodium sulfide, in an organic solvent, such as N-methyl pyrrolidone.

However, the polymers produced such a method exhibit a low molecular weight and are contaminated with various by-products such as linear and cyclic oligomers and decomposition products of the solvent. Such a contaminated low molecular polymer product tends to emit heavily gases when it undergoes hot shaping and forming, and thus to make the shaping and forming procedure difficult and to result in final products having poor strength properties.

Japanese Patent Public Disclosure (KOKAI) No. 59-98133 discloses a modified process of PPS synthesis in which the reaction system comprising a dihaloaromatic compound, a sulfur source and an organic amide polar solvent is pretreated to adjust its water-content to a range of 0.3 to 0.95 moles per mole of the sulfur source, such as sodium sulfide, before the synthesis polymerization reaction. However, since the sulfur source as supplied is generally in a hydrous form and must be thermally dehydrated for a prolonged period of time in the organic amide polar solvent prior to the polymerization, both the sulfur source and the solvent are subject to decomposition or degradation during the dehydration stage, which will lead to generation of by-products, such as oligomers and, thus, to production of PPS of a poor purity in the subsequent PPS synthesis stage.

In order to reduce the content of oligomer impurities in polyarylene sulfides, it has been proposed to separate the reaction mixture, after synthesis of polyarylene sulfide, into the solids and liquid fractions while the mixture remaining hot and further washing the recovered polymeric product with a heated solvent which is the same as the used reaction solvent; see, for example, Japanese Patent Public Disclosure (KOKAI) No. 62-232437. However, this approach can achieve the intended reduction in the oligomer content of the product polymer with the added, complicated procedure for removal of oligomers and will result in an unacceptably decreased productivity of the process.

SUMMARY OF THE INVENTION

A primary object of the present invention is to provide an improved process for producing a highly pure polyarylene sulfide having a relatively increased molecular weight and a decreased content of by-product oligomers.

A further object of the invention is to obviate or substantially reduce the difficulties or problems experienced with the prior art processes.

Another object of the invention is to simplify the process operation by omitting the dehydration stage involved in the conventional processes, and thus to improve the productivity.

Accordingly, the present invention concerns a process for preparing a polyarylene sulfide by reacting an alkali metal sulfide and at least one dihaloaromatic compound in an organic amide solvent at an elevated temperature: characterized in that an anhydrous alkali metal sulfide having a purity of at least 95% by weight and containing not greater than 2% by weight of alkali metal hydrosulfide is employed; that the polymerization reaction is carried out in the presence of water that has been deliberately added in a proportion of 0.1 to 0.8 moles per each mole of the alkali metal sulfide; and that the alkali metal sulfide is charged in a concentration of 2.5 to 5 moles per liter.

DETAILED DESCRIPTION OF THE PREFERRED EMBODIMENT

The present process will be described in more detail.

The invention is primarily characterized by employment of a very pure alkali metal sulfide material that has a purity of at least 95% by weight and contains not greater than 2% by weight as well as by conduction of the polymerization reaction under specific conditions.

The term "purity of alkali metal sulfide" used herein means a value which is determined by the following conventional titration method:

Method for determining purity of alkali metal sulfides

An aqueous alkali metal sulfide solution is treated with barium chloride so that any alkali metal carbonate contained as impurity is converted into barium carbonate, and thereafter the solution is titrated with a hydrochloric acid standard solution so as to quantitatively assay the content of pure alkali metal sulfide.

On the other hand, the quantitative analysis for alkali metal hydrosulfide is made by assaying first the total alkali metal sulfide content by the known iodometric titration technique and, then, subtracting the pure alkali metal sulfide content from the total alkali metal sulfide content.

The purity of the alkali metal sulfide material used in the present invention should be at least 95 wt. %. Preferably, a sulfide material having a purity of 96 wt. % or more is used with better results. If the purity is less than 95 wt. %, the molecular weight of polymer will not be increased to an acceptable extent and the by-product oligomers will be contained at an undesirably high level in the product polymer.

The content of alkali metal hydrosulfide in the alkali metal sulfide material should be preferably 2 wt. % or less. In the case where the hydrosulfide content is in excess of 2 wt. %, the polymer molecular weight will not be increased to a desirable level and any appreciable results will not be achieved, even if the sulfide material has a purity of 95 wt. % or more.

Such a highly pure alkali metal sulfide material suitable for use in the present invention may be prepared by known methods, for example, by heating a hydrated or hydrous sulfide material such as $Na_2S.9H_2O$ under vacuum (see U.S. Pat. No. 2,533,163) or by crystallizing an anhydrous alkali metal sulfide from an aqueous solution thereof under specific conditions (see Japanese Patent Public Disclosure No. 64-28207). Examples of the alkali metal sulfides which may be used in the invention include lithium (Li), sodium (Na), potassium (K), rubidium (Rb) and cesium (Cs) sulfides and mixtures thereof, with sodium sulfide most preferred.

The proportion of water present in the reaction system during the polymerization stage should be in the range of from 0.1 to 0.8 moles per each mole of the alkali metal sulfide used in the system. If the proportion of water in the system is lower than 0.1 mole, then the alkali metal sulfide is poorly dissolved into the organic amide solvent and, hence, it becomes difficult to achieve a desirably increased molecular weight of the product polymer. While, if the reaction system contains water in a proportion in excess of 0.8 moles per mole of the sulfide, then the by-product oligomers tend to be generated in an undesirably large amount.

Although it has been conventional to use a hydrate salt form of alkali metal sulfide and to dehydrate the reaction system so as to adjust the water content to a level, for example, of 0.1–0.8 moles/mole of sulfide, according to the invention an unhydrous form of alkali metal sulfide is employed and water is deliberately added to the system to achieve the preferred water content of 0.1–0.8 moles/mole of sulfide with consequent omission of the conventional dehydration step. This comprises a distinct feature of the invention.

Though we do not wish to be restricted by the following theory, it is thought that the polyarylene sulfides are inhibited from obtaining a desirably increased level of molecular weights due to the presence of decomposition products derived from the organic amide solvent and alkali metal sulfide under the dehydration conditions. That is, during the conventional dehydration step, the organic amide solvent susceptible to hydrolysis is heated to an elevated temperature in the presence of water, and is unavoidably hydrolyzed. At the same time, the alkali metal sulfide which is relatively unstable tends to be decomposed or degraded to some extent under the dehydration condition. The decomposition products from the solvent and sulfide are likely to adversely affect the polymerization. Therefore, the employment of anhydrous alkali meal sulphide with the sequential omission of harmful dehydration step is significantly important for increasing the molecular weight of polymer and for reducing the content of by-product oligomers.

Examples of the dihaloaromatic compounds which may be used in the invention include p-, m- and o-dichlorobenzenes; p-dibromobenzene; p-diiodobenzene; dichloro- and dibromonaphthalenes; dichlorodiphenyl sulfones; dichlorobenzophenones; dichlorodiphenyl ethers; dichlorodiphenyl sulfides; dichlorodiphenyls; dibromodiphenyls; dichlorodiphenyl sulfoxides; and mixture thereof. Preferably, p-dihalobenzenes are employed, in particular p-dichlorobenzene is suitable.

In conjunction with the dihaloaromatic compound, one or more polyhaloaromatic compounds, such as trichlorobenzenes, tribromobenzenes, triiodobenzenes, tetrachlorobenzenes, trichloronaphthalenes, tetrachloronaphthalenes and the like may be used in such a proportion that the linearity of the product polymer is not undesirably disturbed.

Examples of the polymerization solvents which may be used in the present process include N,N-dimethylacetamide, N,N-dimethylformamide, hexamethylphosphoramide, N-methyl-ε-caprolactam, N-ethyl-2-pyrrolidone, N-methyl-2-pyrrolidone, 1,3-dimethylimidazolidinone, tetramethylurea and mixtures thereof.

The solvent should be used in an amount that gives a concentration of charged alkali metal sulfide within the range of 2.5–5 moles/l. If the charge concentration is less than 2.5 moles/l, the by-product oligomers tend to be generated in a disadvantageously large amount. While, if the charge concentration of sulfide is in excess of 5 moles/l, then stirring of the reaction mixture becomes difficult in the polymerization stage and it becomes difficult to attain an acceptably increased molecular weight of the polymer.

In the invention, the alkali metal sulfide and the dihaloaromatic compound are used in such proportions that the molar ratio of alkali metal sulfide to dihaloaromatic compound ranges from 1.00:0.95 to 1.00:1.10, preferably from 1.00:0.98 to 1.00:1.05.

The polymerization reaction may be carried out at about 200°–280° C., preferably 220°–270° C. for 0.5–10 hours, preferably 1–8 hours with stirring. We have found that it is desirable for achieving a satisfactorily increased molecular weight of polymer and a significantly reduced content of oligomers that the polymerization is conducted in two stages; a preliminary stage at about 200°–235° C. for moderating or controlling the vigorous reaction and a subsequent main stage at about 240°–280° C. for completion of the polymerization.

The thus prepared polyarylene sulfide product may be recovered from the reaction mixture in any suitable known manner. For example, the solvent is removed from the reacted mixture by distillation, flashing or the like and then the product polymer is washed with water and recovered. Alternatively, the reacted mixture may be filtered to remove the solvent and then the polymer may be washed with water and recovered.

One of the typical polyarylene sulfides which may be prepared by the present process is poly(p-phenylene sulfide). Other examples which may be mentioned include polyphenylene sulfide sulfones, polyphenylene sulfide ketones, polyphenylene sulfide ethers, polydiphenylene sulfides and copolymers consisting of two or more repeating units constituting the above-listed polymers.

The thus produced polyarylene sulfide may be suitably used in production of not only injection molded articles but extrudates such as fibers, films, pipings and the like.

If desired, reinforcing fillers, for example, glass fibers, carbon fibers, ceramic fibers (e.g., alumina and the like fibers), aramide fibers, wholly aromatic polyester fibers, metallic fibers, potassium titanate whisker and the like may be incorporated to the present PPS copolymer materials. Further, inorganic fillers and organic and inorganic pigments may be incorporated. Examples of the inorganic fillers include calcium carbonate, mica, talc, silica, barium sulfate, calcium sulfate, kaolin, clay, pyroferrite, bentonite, sericite, zeolites, nepheline syenite, attapulgite, wollastonite, PMF, ferrites, calcium silicate, magnesium carbonate, dolomite, antimony trioxide, zinc oxide, titanium oxide, magnesium oxide, iron oxides, molybdenum disulfide, graphite, gypsum, glass beads, powdered glass, glass balloons, quartz, quartz glass, and mixtures thereof.

In addition, plasticizers (e.g., aromatic hydroxy derivatives), mold release agents, silane or titanate coupling agents, lubricants, heat stabilizers, weathering agents, nucleating agents, blowing agents, rust-proofing agents, ion-trapping agents, flame-retardants and flame-proofing aids may also be incorporated, if desired.

If desired, homopolymers such as polyethylene, polypropylene, polybutadiene, polyisoprene, polychloroprene, polystyrne, polybutene, poly α-methylstyrene, polyvinyl acetate, polyvinyl chloride, polyacrylate, polymethacrylate, polyacrylonitrile, polyamides (e.g., nylon 6; nylon 6,6; nylon 6,10; nylon 12; nylon 11; nylon 4,6; etc.), polyesters (e.g., polyethylene terephthalate, polybutylene terephthalate, polyarylates, etc.), polyurethanes, polyacetals, polycarbonates, polyphenylene oxides, polyphenylene sulfide sulfones, polyphenylene sulfide ketones, polysulfones, polyether sulfones, polyaryl sulfones, polyether ketones, polyether ether ketones, polyimides, polyamide imides, silicone resins, phenoxy resins, fluorine resins and the like; random or block graft-copolymers thereof; and mixtures thereof may be blended with the present polymers.

Example

The invention will be further described in detail with reference to the following non-limiting examples.

The melt viscosity of the polyarylene sulfide products prepared in the Examples and Comparative Examples was determined in a KOHKA type flow tester at a temperature of 300° C. and a load of 10 kg using a die of 0.5 mm diameter and 2 mm length.

The content of oligomers in the polymers was determined by extracting a quantity of polymer sample with methylene chloride solvent for a period of 8 hours in a Soxhlet's extractor and weighing the substances dissolved into the solvent.

Example 1

A 500 ml-capacity autoclave provided with a stirrer was charged with 0.45 moles of anhydrous sodium sulfide (which had been prepared by heating $Na_2S.2.8H_2O$ in vacuo and which contained 98.3 wt. % of $Na_2S$ and 0.9 wt. % of sodium hydrosulfide; this anhydrous sodium sulfide material will be referred to as "$Na_2S$-I" hereafter), 0.45 moles of p-dichlorobenzene (referred to as DCB), 0.225 moles of water and 150 g of N-methyl-2-pyrrolidone (referred to as NMP hereinafter). After purging with nitrogen, the autoclave was sealed and then the reaction mixture was subjected to polymerization at 225° C. for 2 hours and subsequently at a further raised temperature of 250° C. for 3 hours. Upon completion of the polymerization, the autoclave was cooled to ambient temperature. The cooled reaction mixture was poured into a large volume of water so as to totally precipitate the polymeric product. The resulting slurry was filtered through a G-4 mesh sintered glass filter. The separated polymer was washed with warm water repeatedly and with a dilute hydrochloric acid and then dried overnight under vacuum with heating. The polymer was recovered at a yield of 94% and showed a melt viscosity of 865 poises as determined by the hereinabove-defined method. The oligomer content of the product polymer was determined by extracting the polymer with methylene chloride in a Soxhlet's extractor and was found to be at a level of 1.8 wt. %. The reaction conditions and the results are summarized in Table 1 below.

Examples 2–7

The procedure of Example 1 was repeated with altering the proportion of added water, the ratio of charged sulfide to aromatic compound: $Na_2S$/DCB, the polymerization time and the quantities of charged materials. The conditions and results are summarized in Table 1.

Comparative Example 1

In this Example, a PPS was synthesized with a sulfur source comprising a hydrous sodium sulfide $Na_2S.2.8-H_2O$ (having a sodium sulfide purity of 59.6 wt. % and a sodium hydrosulfide content of 1.2 wt. %; this sulfur source will be abbreviated as $Na_2S$-II).

A 500 ml-capacity autoclave provided with a stirrer was charged with 0.60 moles of $Na_2S$-II and 150 g of NMP. The mixture was heated up to a temperature of 205° C. under a nitrogen stream with stirring, while distilling off 16.2 g of a distillate comprising mainly of water. Then the reaction system was cooled down to a temperature of 170° C. and thereafter was charged with 0.60 moles of DCB and 50 g of NMP. The autoclave was sealed under a stream of nitrogen. The mixture was allowed to react with producing a polymer at a temperature of 225° C. for 2 hours and subsequently at 250° C. for a further 3 hours. Upon completion of the polymerization, the autoclave was cooled to ambient temperature. The cooled reaction mixture was poured into a large volume of water so as to totally precipitate the polymeric product. The resulting slurry was filtered through a G-4 mesh sintered glass filter. The separated polymer was washed with warm water repeatedly and with a dilute hydrochloric acid and then dried overnight under vacuum with heating. The polymer was recovered at a yield of 94% and showed a melt viscosity of 480 poises. A sample of the product polymer was subjected to the Soxhlet's extraction using methylene chloride and was found to have an oligomer content of 4.6 wt. % that was much higher than those observed in the preceding Examples. The results are shown in Table 1.

Comparative Example 2

The procedure of Example 1 was repeated except that a sulfur source, sodium sulfide (which had been prepared by heating $Na_2S.2.8H_2O$ in vacuo and had an $Na_2S$ purity of 90.1 wt. % and an Nails content of 1.6 wt. %; this sulfur source material will be abbreviated as $Na_2S$-III) was employed in an amount of 0.45 moles in place of $Na_2S$-I. The resulting polymer showed a low melt viscosity of 220 poises and an oligomer content of 3.0 wt. % higher than those observed in the preceding Examples according to the invention. The results are shown in Table 1.

Comparative Example 3

The procedure of Example 1 was repeated except that a sulfur source, sodium sulfide (which had been prepared by heating $Na_2S.2.8H_2O$ in vacuo and which had an $Na_2S$ purity of 96.1 wt. % and an NaHS content of 2.7 wt. %; this sulfur source will be abbreviated as $Na_2S$-IV) was employed in an amount of 0.45 moles in place of $Na_2S$-I. The resulting polymer showed a melt viscosity as low as 150 poises and an oligomer content of 3.4 wt. % higher than those observed in Examples 1–7. The results are shown in Table 1.

Comparative Examples 4–6

The procedure of Example 1 was repeated with various proportions of water and starting materials as set forth in Table 1. Each of these Comparative Examples is not in accordance with the invention. In all the cases, the resulting polymers showed melt viscosities lower than those found in Examples 1–7 and had oligomer contents higher than those observed in Examples 1–7. The results are set forth in Table 1.

Comparative Example 7

A 500 ml-capacity autoclave provided with a stirrer was charged with 0.60 moles of $Na_2S$-II and 174 g of NMP. The mixture was heated up to 220° C. under a nitrogen stream with stirring, while distilling off 23.1 g of a distillate comprising mainly of water. At this stage, water remained in a proportion of 0.8 moles per mole of $Na_2S$ in the system. The system was cooled to 170° C. and then charged with 0.6 moles of DCB. Under a nitrogen stream the autoclave was sealed and heated to a temperature of 260° C. The system was allowed to polymerize at this temperature for 2 hours. Upon completion of the polymerization, the autoclave was cooled to ambient temperature and then the reaction mixture was poured into a large volume of water so as to totally precipitate the polymeric product. The thus resulting slurry was filtered through a G-4 mesh sintered glass filter. The separated polymer was washed with warm water repeatedly and then with a dilute hydrochloric acid and dried overnight under vacuum with heating. The polymer was isolated at a yield of 91% and showed a melt viscosity of 360 poises and an oligomer content of 4.9 wt. %. As above-exhibited, in the case where a hydrous salt form of sodium sulfide is employed, even though the water content in the reaction system is adjusted to a level within the specified range of the present invention by means of the conventional dehydration step i.e. by distillation, prior to the polymerization stage, it would be difficult to significantly increase the melt viscosity (a parameter related to the molecular weight) of the resulting polymer as well as the product polymer would have an undesirably high level of oligomer content (see Table 1).

As can be seen from the foregoing, according to the invention, highly pure polyarylene sulfides having a relatively increased level of molecular weight and a reduced level of the by-product oligomer impurities may be manufactured without being accompanied with the drawbacks of the prior art processes.

TABLE 1

| | $Na_2S$ Type | $Na_2S$ (moles) | charged DCB moles | $Na_2S$/DCB molar ratio | added $H_2O$ moles | $H_2O$/$Na_2S$ molar ratio | NMP (g) | charged $Na_2S$ concentration moles/l | polymerization Temp. (°C.) × Time (hours) | yield (%) | melt viscosity (poises) | impurities oligomers (%) |
|---|---|---|---|---|---|---|---|---|---|---|---|---|
| Examples | | | | | | | | | | | | |
| 1 | $Na_2S$-I | (0.450) | 0.450 | 1.00 | 0.225 | 0.50 | 150 | 3.0 | 225° C. × 2 plus 250° C. × 3 | 94 | 865 | 1.8 |
| 2 | " | (") | " | " | 0.135 | 0.30 | " | " | 225° C. × 2 plus 250° C. × 3 | 96 | 600 | 1.1 |
| 3 | " | (") | " | " | 0.315 | 0.70 | " | " | 225° C. × 2 plus 250° C. × 3 | 93 | 845 | 1.9 |
| 4 | " | (") | 0.446 | 1.01 | 0.225 | 0.50 | " | " | 225° C. × 2 plus 250° C. × 3 | 94 | 1220 | 1.2 |
| 5 | " | (") | 0.441 | 1.02 | " | " | " | " | 225° C. × 2 plus 250° C. × 3 | 93 | 740 | 1.7 |
| 6 | " | (") | 0.450 | 1.00 | " | " | " | " | 225° C. × 5 plus 250° C. × 3 | 94 | 835 | 1.9 |
| 7 | " | (0.675) | 0.668 | 1.01 | 0.135 | 0.20 | " | 4.5 | 225° C. × 2 plus 250° C. × 3 | 92 | 630 | 1.5 |
| Comparative Examples | | | | | | | | | | | | |
| 1 | $Na_2S$-II | (0.600) | 0.600 | 1.00 | 0 | 1.30 | 200 | 3.0 | 225° C. × 2 plus 250° C. × 3 | 94 | 480 | 4.6 |
| 2 | $Na_2S$-III | (0.450) | 0.450 | " | 0.225 | 0.50 | 150 | " | 225° C. × 2 plus 250° C. × 3 | 94 | 220 | 3.0 |
| 3 | $Na_2S$-IV | (") | " | " | " | " | " | " | 225° C. × 2 plus 250° C. × 3 | 94 | 150 | 3.4 |
| 4 | $Na_2S$-I | (") | " | " | 0 | 0 | " | " | 225° C. × 2 plus 250° C. × 3 | 94 | 200 | 2.3 |
| 5 | " | (") | " | " | 0.675 | 1.50 | " | " | 225° C. × 2 plus 250° C. × 3 | 97 | 130 | 3.8 |
| 6 | " | (") | " | " | 0.225 | 0.50 | 225 | 2.0 | 225° C. × 2 plus 250° C. × 3 | 91 | 380 | 3.8 |
| 7 | $Na_2S$-II | (0.600) | 0.600 | " | 0 | 0.80 | 174 | 3.5 | 260° C. × 2 | 91 | 360 | 4.1 |

What is claimed is:

1. A process for preparing a polyarylene sulfide which comprises reacting, at elevated temperature, a mixture consisting essentially of an alkali metal sulfide and at least one dihaloaromatic compound in an organic amide solvent, characterized in that an anhydrous alkali metal sulfide having a purity of at least 95% by weight and containing not greater than 2% by weight of alkali metal hydrosulfide is employed; the polymerization reaction is carried out in the presence of water that has been deliberately added in a proportion of 0.1 to 0.8 moles per each mole of the alkali metal sulfide; and the alkali metal sulfide is charged in a concentration of 2.5 to 5 moles per liter.

2. A process according to claim 1 wherein the alkali metal sulfide is selected from the group consisting of lithium, sodium, potassium, rubidium and cesium sulfides and mixtures thereof.

3. A process according to claim 2 wherein the alkali metal sulfide is sodium sulfide.

4. A process according to any one of claims 1–3, wherein the dihaloaromatic compound is selected from the group consisting of p-, m- and o-dichlorobenzenes; p-dibromobenzene; p-diiodobenzene; dichloro- and dibromonaphthalenes; dichlorodiphenyl sulfones; dichlorobenzophenones; dichlorodiphenyl ethers; dichlorodiphenyl sulfides; dichlorodiphenyls; dibromodiphenyls; dichlorodiphenyl sulfoxides; and mixture thereof.

5. A process according to claim 4 wherein the dihaloaromatic compound is p-dichlorobenzene.

6. A process according to any one of claims 1–5, wherein in conjunction with the dihaloaromatic compound, one or more polyhaloaromatic compounds are employed, in such a proportion that the linearity of the product polymer is not undesirably disturbed.

7. A process according to any one of claims 1–6, wherein the solvent is stable to alkali at elevated temperatures and is selected from the group consisting of N,N-dimethylacetamide, N,N-dimethylformamide, hexamethyl-phosphoramide, N-methyl-ε-caprolactam, N-ethyl-2-pyrrolidone, N-methyl-2-pyrrolidone, 1,3-dimethylimidazolidinone, tetramethylurea and mixtures thereof.

8. A process according to any one of claims 1–7, wherein the molar ratio of the alkali metal sulfide to the dihaloaromatic compound ranges from 1.00:0.95 to 1.00:1.10.

9. A process according to any one of claims 1–8 wherein the polymerization reaction is effected at about 200°–280° C. for a period of 0.5–10 hours with stirring.

10. A process according to claim 9 wherein the polymerization reaction is effected in two stages, a preliminary stage at about 200°–235° C. and a main stage at about 240°–280° C.

11. Polymers which are produced by the process of any one of claims 1–10.

12. A process according to claim 1, wherein said anhydrous alkali metal sulfide has been prepared by heating a hydrous alkali metal sulfide under vacuum to give a dehydrated alkali metal sulfide having a purity of at least 95% by weight and containing not greater than 2% by weight of alkali metal hydrosulfide.

13. A process according to claim 1, wherein said anhydrous alkali metal sulfide having a purity of at least 95% by weight and containing not greater than 2% by weight of alkali metal hydrosulfide is prepared, whereafter the mixture consisting essentially of the alkali metal sulfide, the at least one dihaloaromatic compound and the organic amide solvent is formed by deliberately adding said water.

* * * * *